Patented Aug. 27, 1935

2,012,278

UNITED STATES PATENT OFFICE 2,012,278

CONDENSATION PRODUCT AND PROCESS FOR PREPARING THE SAME

Herbert Hönel, Vienna, Austria, assignor to Beck, Koller & Company, Inc., Detroit, Mich., a corporation of Delaware No Drawing. Original application January 2, 1931, Serial No. 506,297. Divided and this application February 13, 1932, Serial No. 593,189 In Austria August 6, 1927

15 Claims. (Cl. 260—4)

The invention relates to an improvement in condensation products and the process of making the same. The present application is a division of my application Serial No. 506,297, filed January 2, 1931, entitled Process for the production of condensation products, which is a division of my application Serial No. 218,587, filed September 9, 1927, entitled Condensation product and process for preparing same, now Patent Number 1,800,295, granted April 14, 1931.

The claims of the present application are directed principally to reaction products which are formed by the reaction of a fatty oil with an oil soluble phenol-formaldehyde condensation product of the heat hardening type.

It is known that, in general, phenols and formaldehyde, when treated with alkaline contact agents, furnish condensation products which, according to the conditions employed, are either resinous or merely oily to viscous, and pass over, at higher temperatures, into the infusible and insoluble state. The employment of acid contacts furnishes, under certain conditions, fusible and soluble resins which, as is known, find application in the varnish industry.

It is remarkable that resins prepared from p-cresol and formaldehyde differ decidedly, in point of solubility, from those of equal melting point from phenol or o-cresol, and still more from those prepared from m-cresol. Solubility in alcohol is a property common to them all; but whereas the last-named resins are almost completely insoluble in benzol hydrocarbons, the first-named are completely soluble therein, and even in mixtures of the latter with benzine.

It has now been ascertained that by condensing aldehydes and phenols which are substituted in the p-position by a higher saturated hydrocarbon radicle containing four to six carbon atoms, resinous products can be obtained which are completely soluble in benzine, and also in oils, and possess highly valuable properties. Such phenols are, in part, easily prepared owing to the special reactivity of the p-hydrogen atom in the molecule.

A process for the production of resins is known and is set forth in German Patent No. 340,989 in which phenols are first condensed with unsaturated hydrocarbons, by the Koenigs method (Ber. vol. 23, p. 3145; vol. 24, pp. 179 and 3889 and vol. 25, p. 2649), and then with aldehydes. The first condensation produces a mixture of different materials including some p-substituted phenols. Especially in the case of iso-amylenes, the resulting mixture contains only about 6% of the corresponding p-substituted phenol, the remainder comprising uncombined starting materials, together with ether-like compounds and polymerization products of the iso-amylene. The resins obtained by the above process are also soluble only in benzol, but insoluble in benzine. On the other hand, according to the present process, the p-butylphenol obtained from isobutylalcohol and phenol, for example, furnishes with formaldehyde—notwithstanding the smaller aliphatic radicle—a resin which is soluble in benzine in all proportions. As a matter of course, acetaldehyde, for example, furnishes with the same substance a resin which is not less soluble in benzine. Particularly valuable materials are the purified phenols with a p-substituted tertiary radicle, since they furnish with aldehydes very pale resins which are fast to light. Moreover, in order to obtain, with aldehydes, resins of high melting point and satisfactorily soluble in benzine, it is not unconditionally necessary to purify the phenols, prepared in the specified manner, from various by-products, such as those of ethereal character. The starting materials may also consist of phenol mixtures such as crude cresol, it being advisable to take the proportion of phenol and m-cresol into consideration. In such case, the entire reaction mixture, together with the components (p-cresol in particular) which do not enter into the reaction, can be used in the condensation treatment, resins soluble in benzine being nevertheless obtained. The substances (alcohols, haloids, etc.) serving for the substitution of the p-hydrogen atom in the phenol may be used in an unrefined and mixed condition. The substituents may be purely aliphatic or hydroaromatic.

In the case of alkaline contact agents, I have now found that the said p-substituted phenols behave in a very similar manner to p-cresol with regard to condensation with formaldehyde. They can be condensed at different temperatures in the presence of varying amounts of alkali, ammonia, etc. with varying amounts of formaldehyde. According to the conditions, oily to solid masses, clear resins or infusible products are obtained. Equimolecular amounts of formaldehyde, or even up to 2 molecules can be taken up at lower temperatures. The method adopted in order to compound a proportion considerably exceeding the equimolecular one, consists in dissolving the phenol substance in alkalis and leave it in contact with aqueous formaldehyde at a moderate temperature for some time. Even considerably less than equimolecular proportions of alkali will suffice provided uniform solution of the components is effected. The reaction product is finally thrown down from the alkaline solution by means of any acid. The oily or resinous, and still fusible, products may be placed in moulds and transformed into very hard infusible and insoluble resins by the application of heat, preferably accompanied by pressure. The products prepared with more than an equimolecular proportion of formaldehyde become, under this treatment, harder and more elastic than those prepared with only equivalent amounts. Such an excess of formaldehyde is also very useful for the purposes described in the next paragraph. The transition into the infusible state proceeds more slowly than with the known products obtained from phenol and its low homologues. The resinous, still fusible products are just as soluble in benzine and oil as the resins prepared from the same components with acid agents.

Even the slower rate of resinification (i. e. of transition into the infusible state) and other differences in behaviour as compared with the known similar products of the heat hardening type, enlarge the sphere of possible application. Thus, for example, the transition into the insoluble form, when heated, can be entirely prevented by a whole series of substances, even when operating with already viscous products prepared with an excess of formaldehyde, provided such substances be present in not too small amount. Such substances comprise widely varied artificial and natural, acid, neutral or neutralized resins, waxes, fatty oils, etc. Condensation products of the heat hardening type prepared from common phenols can only be reacted with acidic resins (for example, colophony), but yield with neutral resins, oils, etc., non-homogeneous, crumbly masses. It was heretofore unknown how to obtain useful combination products from heat hardening condensation products and such neutral substances. I have now found that condensation products which belong to the heat hardening type and which are derived from those substituted phenols mentioned above can be brought into reaction also with these neutral substances. The latter undergo highly valuable modifications of their physical and chemical properties, such as melting point, hardness, viscosity, resistance to external influences, etc., even when reacted only with relatively small amounts of the said condensation products. The viscosity of fatty oils is extensively increased. The viscosity of the reaction product is not only higher than the mere solution of the (still liquid or viscous) condensation product in the fatty oil, but is also substantially higher than that of the oil solution of an equivalent amount of any resin usually employed in the manufacture of oil varnish. This increase in viscosity is to be regarded as a consequence of a condensation reaction which is accompanied by the formation of a considerable quantity of water. This condensation reaction is suitably carried out at a temperature of about 200° C. A very useful effect can be obtained with raw China-wood oil, for example, inasmuch as the reaction even with small amounts of the said products deprives it of its known undesirable drying character, and produces a clear, but very quick-drying film of great hardness and elasticity.

It should be noted that it is very important in preparing the condensation products that there should be present no unsubstituted phenol (hydroxy-benzol) or meta-cresol. Where even a very small quantity of unsubstituted phenol or meta-cresol is present, the condensation product obtained cannot be reacted with neutral resins and oils, owing to the formation of useless sago-like infusible and insoluble masses within the melted resin or oil employed.

Intermediate products which are not only suitable for being reacted with resins but also with fatty oils, etc., are those obtained from p-substituted phenols with a larger aliphatic radicle. These can also be worked up with melts of resin and fatty oils.

The incorporation of the condensation product can be effected at increased or diminished, instead of ordinary, pressure, or in the presence of inert gases.

*Example 1*

150 grms. of p-tertiary-butylphenol, prepared according to the Liebmann method (Ber. 14, p. 1842 and 15, p. 150) from isobutyl alcohol, phenol and zinc chloride, or in any other way, are heated to boiling with 95 grms, of 30% formaldehyde, in presence of 10 grms. of concentrated hydrochloride acid, for 8-10 hours under a reflux condenser. Finally, the aqueous liquid is separated from the condensation product (which is already almost solid at boiling temperature), and the latter is dehydrated by heating. A nearly water-white resin is obtained, of high melting point, very fast to light, and soluble in benzine and the like in any proportion.

*Example 2*

108 grms. of cresol American U. S. P., 80 grms. of cyclohexanol and 150 grms. of zinc chloride are heated at 180° for three-quarters of an hour. Water is added after cooling, and the reaction product is separated from the aqueous solution of zinc chloride, being thereafter condensed (after having been distilled with 40 grms. of paracetaldehyde with the aid of strong mineral acids. The water is finally eliminated and the resin is preferably freed from any uncondensed substances, in a current of steam. The resin is of high melting point, pale color and soluble in benzine.

*Example 3*

82 grms. of p-tertiary-amylphenol (prepared for example from equimolecular proportions of phenol and tertiary amyl chloride with a little $AlCl_3$) are dissolved to a clear solution in 90 grms. of 30% formaldehyde and 75 cc. of 3n-NaOH, by gentle warming. The charge is maintained at 50–55° C. for about 24 hours, and the viscous oily reaction product is precipitated by any acid, separated from the supernatant aqueous liquid and dried in the water bath. When placed in moulds it can be transformed, under pressure (in autoclaves), into a very hard, infusible resin. Before and after this treatment it is extremely fast to light.

*Example 4*

75 grms. of p-tertiary-butylphenol are condensed for several hours at 100° C. with 50 grms. of 30% formaldehyde and 7.5 grms. of concentrated ammonia, until a clear, viscous resin has been formed, which can easily be separated from the aqueous liquid. It is of a pale lemon-yellow color, and is soluble in benzine and the like in all proportions. On being heated, it passes over into the infusible and insoluble form.

Example 5

20 grms. of the still moist product obtained as in Example 3, are gradually introduced into 100 grms. of fused coumarone resin (soluble in benzine and with the melting point 50–55° C.), the temperature being finally raised to 200° C. The resulting resin, which, if carefully prepared, is pale and soluble in benzine, melts at about 20° C. higher than the originating resin.

Example 6

100 grms. of purified montan wax are treated in the same way as the above coumarone resin. The resulting wax has a considerably higher melting point, and is also much tougher and harder.

Example 7

100 grms. of China-wood oil are treated with 12 grms. of an alkali-condensed product of p-tertiary-butylphenol and formaldehyde, the temperature being finally raised to about 200° C. for a short time. The resulting product has the viscosity of thin stand oil and, when mixed with a suitable amount of drier, dries in about an hour (also in the warm) to a clear film of excellent properties.

Example 8

100 grms. of colophony-glycerol ester, with an acid value below 8 are melted with 25 grms. of a viscous oily condensation product obtained from p-benzylphenol and formaldehyde in presence of alkali. The p-benzylphenol is prepared by the action of molecular quantities of phenol and benzyl chloride in presence of zinc chloride. The fusion of the condensation product with the colophony ester furnishes a perfectly clear resin, melting at about 40° C. higher than the ester, and being very satisfactorily soluble in benzine.

Example 9

100 grms. of dammar resin (m. p. 68–75° C. and acid value 24) are dissolved warm or melted in 20 grms. of mineral spirits, and a phenol-formaldehyde condensation product as in Examples 3, 7 and 8, is gradually added at over 100° C. If the operation be properly carried out, the pale color of the dammar resin will scarcely suffer and the product is equally fast to light and soluble, but at the same time has a higher melting point and is harder.

The present application is also a continuation in part of my application Serial No. 459,845, filed June 7, 1930 now Patent 1,870,455 and of my application Serial No. 506,296, filed January 2, 1931 now Patent 1,968,080.

What I claim is:

1. A process which comprises reacting a fatty oil with an oil soluble condensation product of the heat hardening type obtained by condensing together in the absence of unsubstituted phenol, formaldehyde and a phenol substituted in the para-position by a saturated hydrocarbon radicle containing 4 to 6 carbon atoms.

2. A process as set forth in claim 1 in which the phenol is substituted in the para-position by an alkyl radicle containing 4 to 6 carbon atoms.

3. A process which comprises reacting an excess of a fatty oil with an oil soluble condensation product of the heat hardening type obtained by condensing together, in the absence of unsubstituted phenol, formaldehyde and a phenol substituted in the para-position by a saturated hydrocarbon radicle containing 4 to 6 carbon atoms.

4. A process as set forth in claim 1 in which the phenol is substituted in the para-position by a hydroaromatic radicle.

5. A process as set forth in claim 1 in which the phenol is substituted in the para-position by a tertiary alkyl radicle.

6. A process as set forth in claim 1 in which the phenol is substituted in the para-position by the tertiary butyl radicle.

7. A process as set forth in claim 1 in which the phenol is substituted in the para-position by the tertiary amyl radicle.

8. A process as set forth in claim 1 in which the phenol is substituted in the para-position by the cyclohexyl radicle.

9. The process which comprises reacting China-wood oil with an oil soluble condensation product of the heat hardening type obtained by condensing together, in the absence of unsubstituted phenol, in an alkaline medium a phenol substituted in the para-position by a saturated hydrocarbon radicle containing 4 to 6 carbon atoms, and formaldehyde in excess of the equimolecular quantity.

10. A process as set forth in claim 9 in which the China-wood oil is reacted with an alkali condensed product of a para-tertiary-alkylphenol and formaldehyde.

11. A process as set forth in claim 1 in which the temperature is raised to about 200° C. during the process.

12. A process which comprises reacting a drying oil with an oil soluble condensation product of the heat hardening type obtained by condensing together in the absence of unsubstituted phenol, formaldehyde and a phenol substituted in the para-position by a saturated hydrocarbon radicle containing 4 to 6 carbon atoms.

13. A clear homogeneous reaction product formed by reacting an excess of a fatty oil with an oil soluble condensation product of the heat hardening type obtained by condensing formaldehyde in the absence of unsubstituted phenol with a phenol substituted in the para-position by a saturated hydrocarbon radicle containing 4 to 6 carbon atoms, the reaction product being distinguished by its substantially higher viscosity as compared with the mere solution of the condensation product in the fatty oil before having undergone the reaction.

14. A clear homogeneous reaction product formed by reacting a drying oil with an oil soluble condensation product of the heat hardening type obtained by condensing together, in the absence of unsubstituted phenol, formaldehyde with a phenol substituted in the para-position by a saturated hydrocarbon radicle containing 4 to 6 carbon atoms, the reaction product being distinguished by its substantially higher viscosity as compared with the mere solution of the condensation product in the drying oil before having undergone the reaction.

15. A homogeneous reaction product formed by heating to a temperature of approximately 200° C. an excess of China-wood oil and an oil soluble condensation product of the heat hardening type obtained by condensing together in the absence of unsubstituted phenol, formaldehyde and a phenol substituted in the para-position by a saturated hydrocarbon radicle containing 4 to 6 carbon atoms, said homogeneous reaction product being capable on drying of producing a clear film.

HERBERT HÖNEL.